United States Patent [19]

Allen

[11] Patent Number: 4,987,286
[45] Date of Patent: Jan. 22, 1991

[54] METHOD AND APPARATUS FOR REMOVING MINUTE PARTICLES FROM A SURFACE

[75] Inventor: Susan D. Allen, Iowa, Iowa

[73] Assignee: University of Iowa Research Foundation, Iowa, Iowa

[21] Appl. No.: 429,026

[22] Filed: Oct. 30, 1989

[51] Int. Cl.$^5$ .................................................. B23K 26/00
[52] U.S. Cl. ............................. 219/121.68; 219/121.6; 219/121.84
[58] Field of Search .................. 219/121.68, 121.69, 219/121.67, 121.72, 121.84, 121.85, 121.6

[56] References Cited

U.S. PATENT DOCUMENTS

| | | | |
|---|---|---|---|
| 4,368,080 | 1/1983 | Langen et al. | 134/1 |
| 4,670,637 | 6/1987 | Morrison et al. | 219/121.6 |
| 4,720,621 | 1/1988 | Langen | 219/121.6 |
| 4,752,668 | 6/1988 | Rosenfeld et al. | 219/121.68 |

FOREIGN PATENT DOCUMENTS 0190795  11/1982  Japan ............................. 219/121.84

OTHER PUBLICATIONS

"Contaminant and Defect Analysis of Optical Surfaces by Infrared Laser Induced Desorption", Susan D. Allen, Appl. Phys. Lett. 45(9), Nov. 1, 1984, pp. 997–999.

Primary Examiner—C. L. Albritton
Attorney, Agent, or Firm—Leydig, Voit & Mayer

[57] ABSTRACT

Method and apparatus for removing minute particles (as small as submicron) from a surface to which they are adhered. An energy transfer medium is interposed between each particle to be removed and the surface to which the particles are adhered. The medium is an irradiated with laser energy at a wavelength which is strongly absorbed by the medium. The medium absorbs sufficient energy to cause explosive evaporation with sufficient force to dislodge the particles. Preferably means are provided to remove dislodged particles to prevent redeposit on the surface.

23 Claims, 4 Drawing Sheets

METHOD AND APPARATUS FOR REMOVING MINUTE PARTICLES FROM A SURFACE

FIELD OF THE INVENTION

This invention relates to removal of particulate contaminants from surfaces, and particularly to removal of small particles in the micron range and smaller.

BACKGROUND OF THE INVENTION

Particle contamination of surfaces is a concern in many areas of technology. Two areas where such contamination can be a very significant problem are optics, particularly those with critical optical surfaces, and electronic fabrication. The effect of contaminants on critical optical surfaces (coated or uncoated, dielectric or metal), for example in high power laser optics, can lead to increased optical absorption and a decreased laser damage threshold. Thus, as minute particles contaminate optical surfaces, they can serve as sinks for optical power incident on the optical surfaces and thus produce localized heating and possible damage. High power telescope mirrors, and space optics are other applications which require highly decontaminated critical optical surfaces.

In the electronics industry, particle contamination is an important factor in the manufacture of high density integrated circuits. Even in relatively conventional technology using micron or larger circuit patterns, submicron size particle contamination can be a problem. Today the technology is progressing into the submicron pattern size, and particle contamination is even more of a problem. Contaminant particles larger than roughly 10% of the pattern size can create damage such as pinholes which interfere with fabrication processes (such as etching, deposition and the like) and defects of that size are a sufficiently significant proportion of the overall pattern size to result in rejected devices and reduced yield. As an example, it has been found that the minimum particle size which must be removed in order to achieve adequate yield in one Megabit chip (which has a pattern size of one micron) is about 0.1 microns.

Filtration (of air and liquid), particle detection, and contaminant removal are techniques which are used in current contamination control technology in order to address the problems outlined above. For example, semiconductor fabrication is often conducted in clean rooms in which the air is highly filtered, the rooms are positively pressurized, and the personnel allowed into the room are decontaminated and specially garbed before entry is allowed. In spite of that, the manufactured devices can become contaminated, not only by contaminants carried in the air, but also by contaminants created by the processes used to fabricate the devices. Removal techniques for contaminants should provide sufficient driving force for removal but without destroying the substrate. Moreover, acceptable removal techniques should provide a minimum level of cleanliness in a reliable fashion. As the particle size decreases the particle weight becomes less significant as compared to other adhesive forces binding the particle to the surface which it contaminates. Removal of such small particles can potentially damage the substrate. In general, it has been found that submicron particles are the most difficult to remove. Many of the processes developed to clean integrated circuits, such as ultrasonic agitation, are not effective for micron and submicron particles and indeed, sometimes add contaminants to the substrate.

SUMMARY OF THE INVENTION

In view of the foregoing, it is a general aim of the present invention to provide a particle removal method and apparatus capable of removing micron size particles in demanding applications such as semiconductor fabrication or optical systems with critical optical surfaces.

In that regard it is an object of the present invention to provide a particle removal apparatus and method which provides adequate energy to drive the particles from the surface to which they are adhered but without the danger of damaging the underlying surface.

According to another aspect of the invention it is an object to provide a particle removal system and apparatus which utilizes an intermediary for particle removal, and an energy source to which the intermediary is highly responsive but to which the underlying surface is not, thereby to effectively remove the particle without damaging the underlying surface.

Stated differently, an object of the invention is to provide a particle removal system and apparatus which utilizes an energy transfer medium which is first interposed between the particle and the surface to be cleaned, and an energy source to which the transfer medium is particularly responsive, the transfer medium serving to convert energy from the source to kinetic energy used to free the particle.

Other objects and advantages will become apparent from the following detailed description when taken in conjunction with the drawings in which:

DESCRIPTION OF THE PREFERRED EMBODIMENTS

While the invention will be described in connection with certain preferred embodiments, there is no intent to limit it to those embodiments. On the contrary the intent is to cover all alternatives, modifications, and equivalents included within the spirit and scope of the invention as defined by the appended claims.

Figure 1:
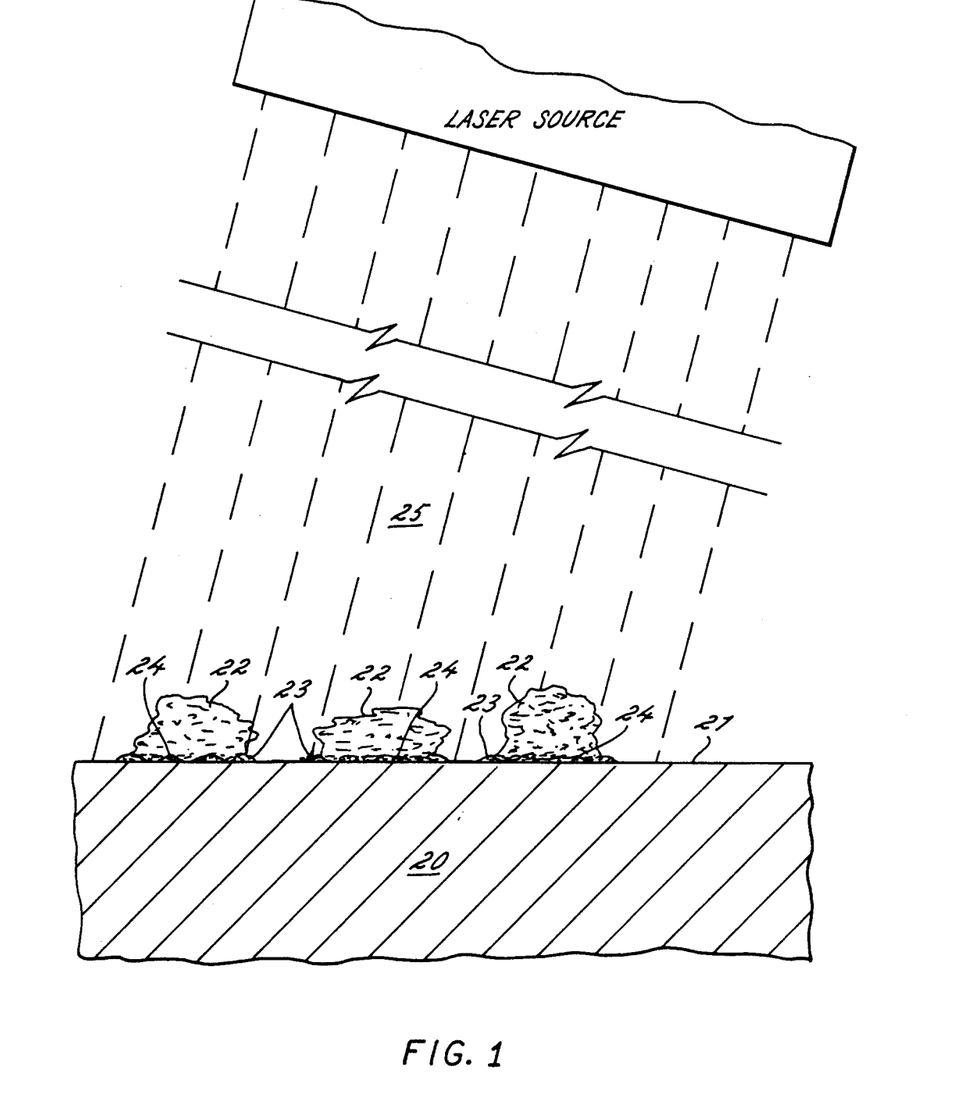
FIG. 1 is a diagram schematically illustrating a contaminated surface with adhered particles illustrating the practice of the present invention.

Turning now to the drawings, FIG. 1 schematically illustrates the major elements of a system for use in the practice of the present invention. The drawing shows, in cross-section, a portion of a substrate 20 bearing contaminant particles 22 which are adhered to a surface 21. The particles 22 are bound to the surface 21 by any of a number of forces. The particles are deposited usually by a complex process which may include diffusion, sedimentation, inertia, and electrical or electrostatic attraction. When the particles are very small, gravity is a minor source of adhesion, and other sources of greater significance are Van der Waals forces, electrostatic forces, capillary forces, and the like. Adhesion forces and the factors necessary for dislodging particles held by such forces will be considered in greater detail below. Suffice it to say for the present that as the particles become smaller, the forces causing adhesion tend to be significant as compared to the area of the surface affected, and removal of such particles becomes a rather a significant problem.

In accordance with the invention, an energy transfer medium is interposed between the surface 21 and the particles 22, such medium being illustrated in the drawing as layer 23 which occupies the interstices 24 formed between the adhered particles 22 and the surface 21. It has been found convenient in many situations to use an energy transfer medium which is normally considered a liquid. A currently preferred liquid is water, since water efficiently adsorbs into the interstices by capillary action in many of the substrates being considered, evaporates without leaving a residue, and is compatible in absorption wavelength with available lasers of appropriate power. The water is applied to the surface, sometimes at a reduced temperature, in order to assure that an adequate volume of water is interposed between the particle to be removed and the surface from which it is to be removed. It will be appreciated, however, that the energy transfer medium need not be liquid and can also be a gas or a solid. Indeed, when water is utilized at the temperatures discussed below, water will be a solid. Gas may also be useful in particular situations. The common characteristic of the energy transfer medium, regardless of its phase, is that an adequate mass of the material effectively occupies the space between the particles to be removed and the surface from which they are removed, and that the medium furthermore convert incident laser energy into kinetic energy for transfer to the particles.

Having thus prepared the surface for cleansing in accordance with the invention, energy is then impinged upon the surface to be cleaned, such energy being at a wavelength which is preferentially absorbed by the energy transfer medium. In FIG. 1, a laser beam 25 is directed at surface 21 which carries the contaminant particles and interposed layer 24. A quantity of energy is absorbed in the transfer medium which is sufficient to cause explosive evaporation of the medium. The quantity of material interposed between the particle and the surface is such that, when explosive evaporation occurs, the particle is driven from the surface by the force of the explosion. In effect, the laser energy incident on the surface is converted by the transfer medium from potential to kinetic energy, and is transferred to the particle, driving it from the surface to which it had been adhered.

Further in practicing the invention, means are provided for collecting or otherwise removing dislodged particles once freed from the surface, so as to prevent the particles from redepositing on the surface. Preferably, the explosive evaporation occurs with the substrate in a vacuum chamber, such that any dislodged particles are removed by means of the vacuum creating equipment. As will be described in greater detail below, as an alternative, a gas jet can be provided which impinges a stream of gas onto the surface to carry the dislodged particles away. In an application in space, no gas jet or vacuum will be needed, since the velocity imparted to the particles by explosive evaporation will be adequate to transfer the particles away from the surface. In any case, the requirement is simply for providing a velocity component to the particles which will carry the particles away from the surface to avoid recontamination.

Before turning to examples illustrating particular implementations of the invention, certain of the principles useful in the application thereof will first be discussed. As noted above, as particle size decreases, particle weight becomes the least significant of the adhesive forces binding a contaminant particle to the surface. For small particles, gravity thus becomes insignificant to the overall adhesion forces whereas Van der Waals, electrostatic and surface tension forces contributed by liquid films are (singly or in combination) the major forces which cause adhesion of small particles. As it is well known, Van der Waals forces represent the attraction between induced dipoles in the particle and the substrate, and are always present. Electrostatic forces result from the attraction between oppositely charged particles and substrate. Electrostatic forces are less significant on conductive substrates due to the dissipation of charge, but can be quite large for insulators. Capillary forces arise from surface tension of a liquid drawn into capillary spaces around the contact points of the contaminant particle and substrate. Environmental factors such as temperature and pressure, and surface characteristics such as composition and roughness, are some of the factors which affect these adhesive forces.

Due to the difficulty in defining or measuring variables such as contact area, separation distance or particle shape, the adhesion equations which relate such variables are generally semiempirical. Suffice it to say, however, that the forces which cause adhesion between particular types of particles and particular types of substrates can be characterized, and it is found that, for smaller particles, adhesion forces are proportional to the particle diameter. The result of this relationship is that the ratio of adhesion force (which is proportional to particle diameter) to particle mass (which is proportional to diameter cubed) increases as the particle size decreases. Furthermore, it is found that the ratio increases almost exponentially as the particle size becomes submicron. As a result of these factors, micron and submicron particles are the most difficult to remove for mass or volume mediated removal techniques such as vibrational or centrifugal cleaning.

Thus, it is found in practicing the invention that the substantial adhesion forces (as compared to particle size) are accommodated if an adequate volume of energy transfer medium is interposed between the surface and the particle to be removed, and an adequate supply of energy is absorbed into the medium to generate sufficient force to overcome the adhesion forces binding the particle to the surface.

Figure 2:
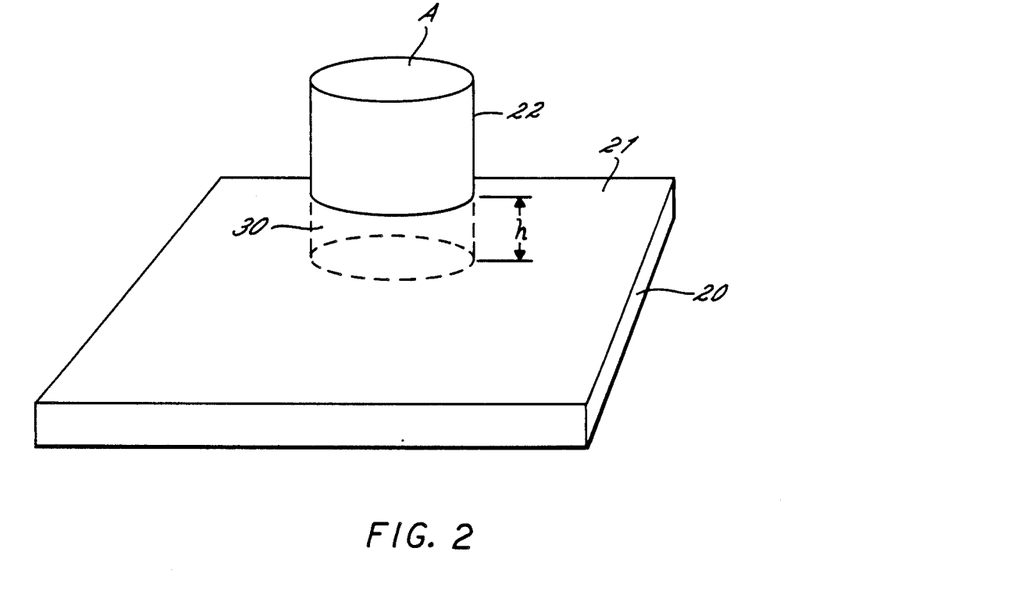
FIG. 2 is a diagram of a surface with a contaminant particle useful in understanding the present invention.

FIG. 2 illustrates relationships for a system useful in determining such forces. Thus, there is shown is FIG. 2 a schematically illustrated substrate 20 having a surface 21 to which it bound a particle 22, shown for convenience as a cylindrical particle, although as will be appreciated the relationships derived herein will be applicable to particles of irregular shape.

Disposed between the particle 22 and the surface 21 is a cylindrical volume 30 having a surface area equal to the surface area A of the particle and a height h. The volume 30 thus represents the energy transfer medium (of surface area A and height h), interposed between the particle 22 and surface 21.

A laser beam with fluence $\phi$ (J/cm$^2$) is incident on the region that contains the particle and the interposed column. The dissipated energy density is $\phi/\delta$, where $\delta$ is the absorption depth of the laser beam in the material filling the column 30. For simplicity, it is assumed that the molecules of the energy transfer medium behave as an ideal gas and that the laser energy is instantly converted into thermal energy in the molecules. The equation governing the pressure (P) and volume (V) of n moles of an ideal gas is $PV = nRT.$ The absorbed laser energy, transformed into kinetic energy of the molecules of the energy transfer medium, is related to temperature as:

$E = m(v_{rms})^2/2 = (3/2)nRT$ and to the laser fluence as $E = \phi V_h/\delta,$ where $V_h$ is the volume of laser heated transfer medium. It will be appreciated from the foregoing that reflection and scattering is neglected. Combining the above expressions, the forces exerted by the molecules of the energy transfer medium on a particle of cross-sectional area A becomes $F = PA = 2A\phi/3[\text{Max. }(h,\delta)],$ where [Max. (h,δ)] indicates that the expression should be evaluated for whichever of h or δ is larger. As an example, the removal force for a one micron diameter particle, using an unfocused laser beam of intensity 0.1 J/cm², is 650 dynes (δ=0.8 microns and h<δ) which is roughly 3 orders of magnitude larger than the adhesion force binding a one micron particle to the surface. Furthermore, assuming that the substrate being cleaned is silicon, since the damage threshold of silicon is 55 J/cm², utilizing an intensity of only 0.1 J/cm² to assure particle removal allows a further margin of error of an additional 3 orders of magnitude before surface damage is encountered. As a further advantage, since the laser assisted particle removal forces described above are proportional to the cross-sectional area of the particle, use of this technique has a geometric advantage over conventional removal techniques which are proportional to the particle volume.

The foregoing has related the empirically determined force which binds a particle to the surface to the removal forces generated by explosive evaporation according to the present invention. It has been shown that a force can be generated when the invention is properly applied which is orders of magnitude greater than that which binds the particle to the surface, while still being orders of magnitude less than that capable of damaging the surface. The kinetic force which is brought to bear by the energy transfer medium as a result of absorbing energy and translating the absorbed energy to kinetic energy has been shown to be related to the laser fluence, the volume and shape of the liquid interface, and the absorption depth of the laser beam at the particular wavelength in the material of the energy transfer medium.

Certain refinements can be included in the foregoing model, although as will be appreciated the model is adequate for most purposes. With respect to one refinement, for small particles of interest, the laser energy is efficiently diffracted around the particle, allowing absorption of the bulk of energy by the energy transfer medium in the interstices. For larger particles, however, some of the medium in the interstices water can be shadowed by the particle, with the result being a decrease in coupling efficiency of the laser to the medium. The optical properties of the particle and substrate can also affect the energy absorption.

The major force which drives the particle removal mechanism according to the invention is the energy absorption by the adsorbed transfer medium/ particle system, and transformation of that absorbed energy into kinetic energy. Conductive losses to the substrate are expected to be small and generally can be neglected. However for certain irradiation protocols, conductive losses to the substrate may become a factor and should be considered.

Finally, in the foregoing the explosive evaporation of the energy transfer is analyzed in the context of a spherical water droplet heated with a pulsed laser. In some cases the reaction of the water interface to the pulsed laser may differ because of the capillary geometry, and consideration of that factor may prove necessary in a certain restricted number of cases.

Figure 3:
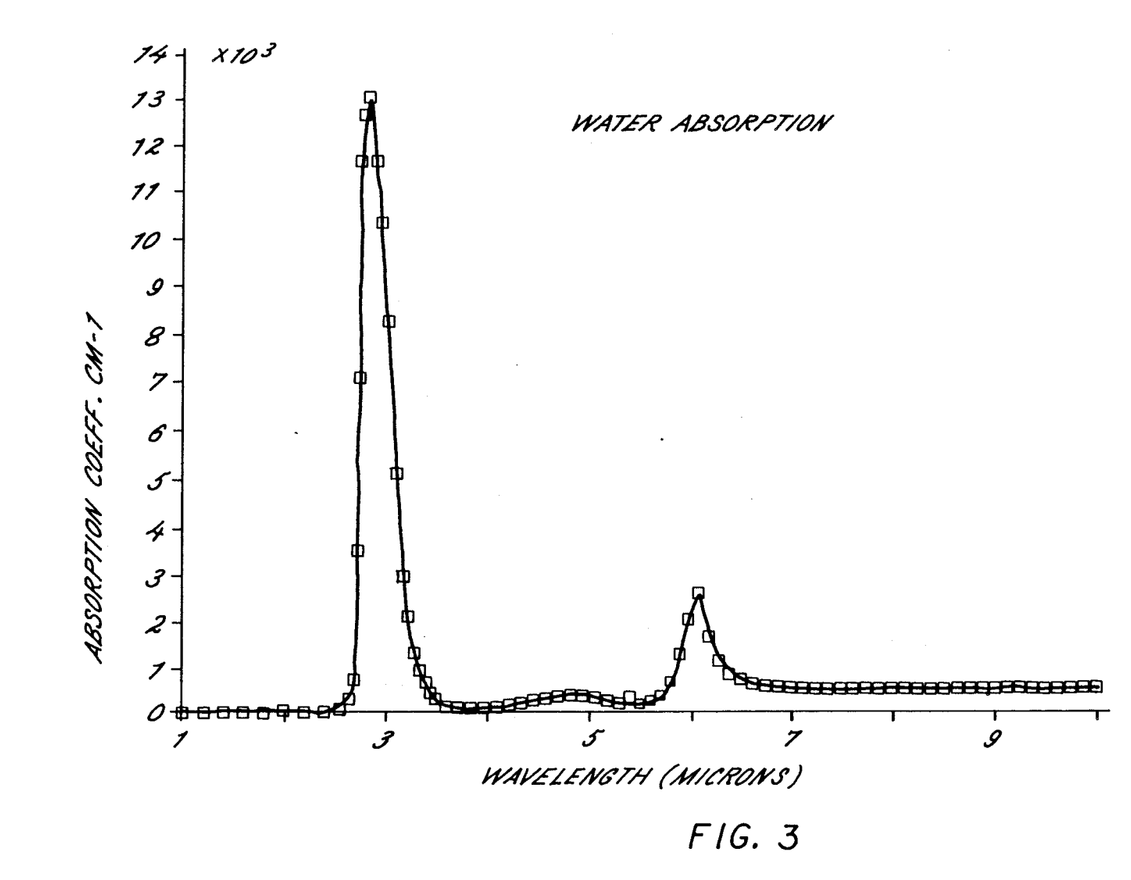
FIG. 3 is a diagram plotting the absorption coefficient of water with respect to wavelength of impinging radiation.

As noted above, water is currently the preferred energy transfer medium because of a number of properties, including the property of coupling well to readily available lasers. FIG. 3 shows the water absorption spectrum across a range of laser wavelengths, and plots laser wavelength in microns against absorption coefficient. Increasing absorption coefficient indicates an increased amount of energy absorption within a given volume of water. It is seen from FIG. 3 that water has a response which is sharply peaked at just below 3 microns. It has been found that water as well as certain alcohols are strongly adsorbed at surface defects in high-power laser optical materials, but that such adsorbed water can be removed by laser irradiation at wavelengths of just less than 3 microns. We prefer to use an Er:YAG laser which is known to have an output wavelength of 2.94 microns, a wavelength strongly absorbed by water. The laser preferably has a pulse length which is adjustable from about 70 ns to about 250 (μs). A beam diameter in the range of 0.1 to about 1 mm is preferred. When practicing the invention in connection with semiconductor materials or substrates for critical optical surfaces, it is found that a laser which operates at a wavelength of about 2.94 microns does not substantially affect many substrates of interest (such as silicon, gallium arsenide or silicon dioxide), since such substrates are transparent to the laser wavelength in question.

Finally, with respect to configuration of the energy transfer medium, it was noted above that for applications considered thus far, a liquid material is preferred, most preferably water. It was also noted that gas or solid phase materials can also be used as the energy transfer medium, and indeed, as will be appreciated in the example given below, water is applied but at a temperature sufficiently low to use water in its solid ice form. Assuming for the moment, however, that the energy transfer medium to be used is water, in applying such liquid, the contaminated substrate is dosed with water which is preferentially adsorbed in the capillary spaces around the particles to be removed, i.e. in the interstices between the particles and the surface to be cleaned. In many cases it is preferable to dose the surface with liquid while maintaining the system at a reduced temperature and in a vacuum in order to enhance adsorption into the capillary spaces. For example, liquid nitrogen can be used to cool the substrate to 130° K., the temperature at which the vapor pressure of water is $10^{-10}$ T. If the substrate is maintained at a reduced pressure such as $10^{-10}$ T, while cooling the substrate to about 130° K., adsorption of the water into the capillary spaces will be enhanced.

It is referred that after water is adsorbed on the surface and into the interstices, the temperature of the substrate be raised so that surface water is desorbed while water in the interstices remains in place. It is known that the desorption threshold temperature for water adsorbed on a surface is less than the temperature at which water molecules in capillary spaces are desorbed, i.e. capillary water is more strongly bound than on clear, defect-free substrates. Thus, the temperature of the substrate is raised after the surface is dosed with water to a temperature which will induce desorption of water from the surface while allowing adsorbed water in the interstices to remain. It has also been found that the desorption threshold temperature is not the same for different particles due to their different effective capillary size, and thus the temperature to which the system is raised is somewhat dependent upon particle shape, size and composition. However, it is currently believed that having dosed the surface at approximately 130° K., it will be adequate to raise the temperature to a level at which water on the surface is seen to be desorbed prior to irradiating the system with laser energy. Thus, having removed the surface water and allowed only the water in the interstices to remain, that being the water which will provide the mechanism for particle removal, when the system is irradiated with laser energy, the bulk of the energy will be available to accomplish the function of particle removal. If the temperature is raised to an undesirably high level causing desorption of water from beneath some of the particles, it will be found that the particles are not removed in the subsequent irradiation step, and it will be necessary to again to dose the surface with water and re-irradiate the surface but at a somewhat lower temperature.

Figure 4:
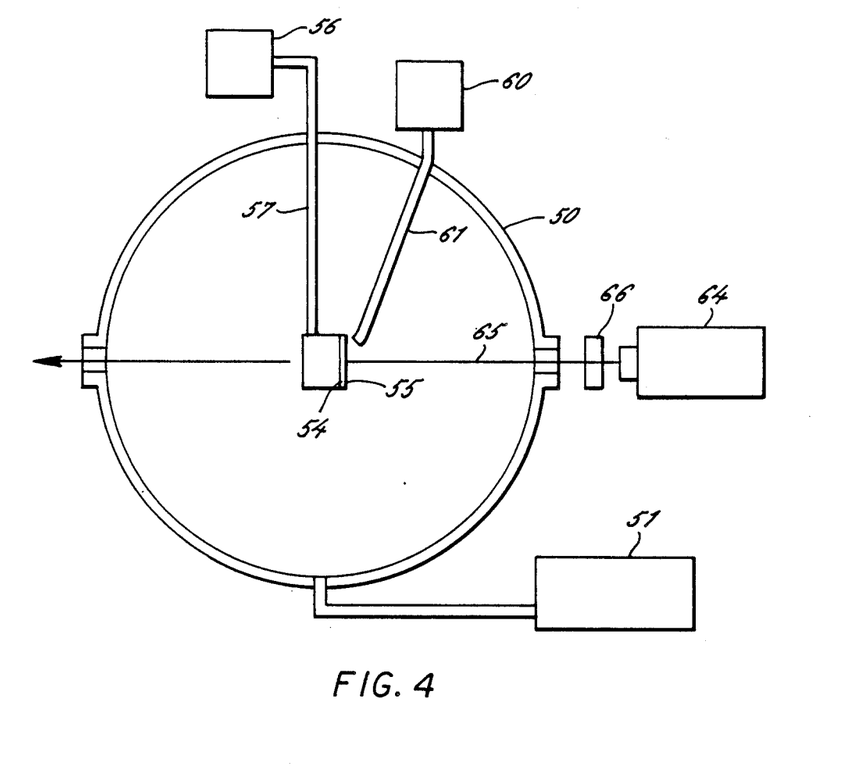
FIG. 4 is a diagram illustrating a preferred embodiment of a system exemplifying the present invention.

Turning now to FIG. 4, there is shown apparatus configured for practice of the present invention. The apparatus includes a sealable chamber 50 which is coupled to a vacuum source 51 for evacuating the chamber 50. Mounted on a support (not shown) in the chamber 50 is a substrate 54 to be cleaned. The substrate 54 has a surface 55 which contains contaminant particles (not shown in the scale of FIG. 4) which are to be removed.

For the purpose of controlling the adsorption and the description of liquid materials such as water, a cooling source 56 is coupled by conduit 57 to the substrate 54. As noted above, the temperature of the substrate 54 is reduced when water is originally applied to the surface 55, then increased to reduce surface adsorption while maintaining capillary adsorption in the interstices.

For the purpose of dosing the surface with liquid, such as water, to form the interface, a liquid source 60 is provided and is coupled by means dosing tube 61 to the surface 55 of the substrate 54. Liquid supplied by source 60, is coupled through dosing tube 61 and applied to the surface 55 at the appropriate temperature to assure water adsorption on the surface and in the interstices. After water dosing, the temperature of the substrate 54 is raised by means of the cooling source 56, preferably causing desorption of surface water while maintaining water in the interstices.

With the sample thus prepared for cleaning, a laser source, 64 is energized, preferably in the pulsed mode to couple pulses of energy in a beam illustrated at 65 to the surface 55. Means 66 are diagrammatically illustrated for steering the beam if necessary. As an alternative, the sample itself can be moved within the chamber 50 to direct the laser beam to the desired area of the surface 55. In any event, the beam 65 is focused on the areas of the surface 55 which are to be cleaned and the laser 64 pulsed to couple adequate energy to the surface 55. The adequacy of the energy is determined by the nature of the liquid interface, the adhesion force of the particles, and the other factors described above. An adequate quantity of energy is coupled from the laser source 64 to cause absorption of sufficient energy in the liquid interface to cause explosive evaporation and particle removal.

As seen in FIG. 4 the sample 54 is mounted vertically such that particles which are driven from the surface 55 can fall by means of gravity without redepositing on the surface. The vacuum source 51 is filtered in order to remove particles which have been freed while maintaining the atmosphere within chamber 50 at a high vacuum and clean. As an alternative the samples 54 can be mounted horizontally with the surface 55 facing downwardly to get a further gravity assist for removal of particles once they are freed from the surface. Indeed, any mounting orientation compatible with the mechanism for removing the dislodged particles will be adequate. In most earthbound applications any orientation from the vertical illustrated in FIG. 4 to horizontally inverted will be acceptable in order to utilize a gravity assist in evacuating dislodged particles. When a system is utilized which introduces an external force for imparting particle velocity (such as the gas jet to be described below), other orientations for the surface to be cleaned might also be utilized.

In an actual experiment using a system such as illustrated FIG. 4, a substrate of n-type silicon (1-1-1) was contaminated with alumina powder ($Al_2O_3$). The particle size of the powder varied from a few microns to submicron. The powder was mixed with acetone and a few droplets of the mixed slurry placed on the substrate. The particle removal procedure was performed after evaporation of the acetone.

A liquid energy transfer medium was applied to the surface of the contaminated substrate, comprising pure water. A Lumonic TEA laser was used for irradiation, and the laser wavelength was 10.6 microns and the pulse energy 55 mJ. An ED-200 Gentech energy meter was used to measure the energy. A 10 inch ZnSe lens was used to focus the laser source on the substrate. After dosing of the contaminated substrate with water, the substrate was irradiated by a 55 mJ pulse from the aforementioned laser using the 10 inch ZnSe lens located at a distance of 10.5 inches from the substrate. The beam angle with the substrate was 40°. A photograph was taken of the substrate after contamination, and another after dosing and laser irradiation. A further photograph was taken of the substrate which was irradiated with laser energy but without water dosing. A comparison of the pretreatment photograph with the photograph taken of the substrate which was laser irradiated but without water dosing indicated substantially no particle removal. However, the photograph taken of the substrate subjected to the process according to the present invention showed considerable removal of particles had taken place. Furthermore, it is shown that additional irradiation of the surface beyond a single pulse causes further removal of particles. It was found that a sample which had been dotted and irradiated by five laser pulses was substantially cleaned of contaminant particles.

Figure 5:
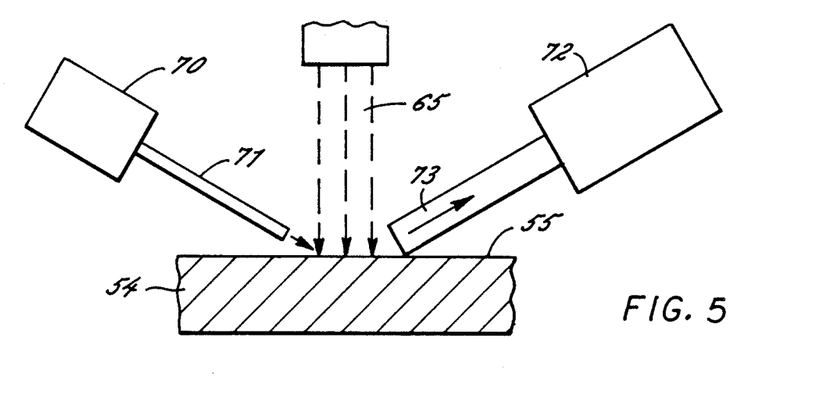
FIG. 5 is a diagram illustrating an alternative system constructed in accordance with the present invention.

Turning now to FIG. 5, there is shown an alternative configuration adapted for removal of dislodged particles before such dislodged particles can redeposit on the surface. FIG. 5 does not contain all of the detail of FIG. 4 but instead shows only the substrate 54 having a contaminated surface 55 which is to be cleaned. The laser 65 is shown as being incident on the surface 55 which, as will be appreciated, has been dosed to provide an energy transfer medium interposed between the particles to be removed and the surface 55. Operating in conjunction with the laser 65 which dislodges the particles is a gas source 70 and an outlet conduit 71 adapted to impinge a gas jet on the surface. A vacuum source 72 having a conduit 73 directed at the surface being cleaned can also be used for drawing away particles freed by the laser 65. The system of FIG. 5 demonstrates that the invention can be practiced without a vacuum, but in most situations it will be useful to have an auxiliary mechanism, such as the gas jet, to impart a velocity to the dislodged particles to remove them from the area of the surface to avoid recontamination. It was noted above that in space based applications, such a mechanism may not be necessary since the velocity imparted by explosive evaporation of the energy transfer medium will impart adequate velocity to the particles to carry them away from the surface being cleaned. Thus, the system of FIG. 5 is merely exemplary of additional structure which can be used for removing particles once they are freed in the practice of the present invention.

It will now be appreciated that what has been provided is a method and means for cleaning of a substrate which has particular application in the semiconductor fabrication arts and optical arts which utilize critical optical surfaces. Such arts require the removal of contaminant particles on the order of microns in diameter and can require removal of submicron size particles. In contrast to prior techniques which suffer substantial difficulty in removing such small particles, in accordance with the present invention, the surface bearing the contaminant particles is dosed with an energy transfer medium which is interposed between the particles to be removed and the surface to which they are adhered. Laser energy is then used to irradiate the surface, and the laser energy is at a wavelength preferentially absorbed in the energy transfer medium. A sufficient amount of laser energy is coupled to the surface to cause explosive evaporation of the medium, thereby creating substantial amounts of very localized energy at the site of the particles, overcoming the binding forces of the particles to the surface and freeing the particles. Means are then provided for removing the particles before redisposition can occur.

I claim:

1. A method of removing particles adhered to a surface comprising the steps of:
   adsorbing an energy transfer medium into interstices between the particle to be removed and the surface,
   irradiating the medium in the interstices with laser energy at a wavelength strongly absorbed by the medium,
   absorbing sufficient energy in the medium to cause explosive evaporation thereof with sufficient force to dislodge the particle.

2. The method as set forth in claim 1 further comprising the step of maintaining the surface at a temperature adequate to desorb said medium from the surface while allowing the medium to remain in the interstices, thereby to concentrate the energy transfer medium between the particles to be removed and the surface.

3. The method as set forth in claim 1 wherein the energy transfer medium is water.

4. The method as set forth in claim 3 wherein the laser is an Er:YAG laser having a wavelength of about 2.94 microns which is strongly absorbed by water.

5. The method as set forth in claim 1 further comprising the step of removing particles after they are dislodged and before they can again adhere to the surface.

6. The method as set forth in claim 5 wherein the explosive evaporation is accomplished in a vacuum for removing dislodged particles before they can again adhere to the surface.

7. The method as set forth in claim 5 wherein the step of removing dislodged particles comprises impinging a gas jet onto the surface for imparting a velocity to the dislodged particles adapted to remove the dislodged particles before they can again adhere to the surface.

8. The method as set forth in claim 1 wherein the adsorbing step comprises dosing the surface with liquid while maintaining the surface at a temperature sufficiently low to cause adsorption of liquid into the interstices, and raising the temperature of the surface to a level sufficient to desorb surface adhered liquid while retaining the liquid adsorbed in the interstices.

9. A method of removing particles adhered to a surface comprising the steps of:
   interposing between each particle to be removed and the surface to which the particle is adhered an energy transfer medium,
   irradiating the surface carrying the adhered particles and energy transfer medium with laser energy of a wavelength highly absorbed by the interposed medium, and
   absorbing sufficient laser energy in the interposed medium to transform said laser energy into kinetic energy in the medium thereby dislodging the particles from the surface.

10. The method as set forth in claim 9 further comprising the step of maintaining the surface at a temperature adequate to desorb said medium from the surface while allowing the medium interposed between the particles and the surface to remain, thereby to concentrate the liquid between the particles to be removed and the surface.

11. The method as set forth in claim 9 wherein the energy transfer medium is water.

12. The method as set forth in claim 11 wherein the laser is an Er:YAG laser having a wavelength of about 2.94 microns strongly absorbed by water.

13. The method as set forth in claim 9 further comprising the step of removing dislodged particles before the dislodged particles can again adhere to the surface.

14. The method as set forth in claim 13 wherein the explosive evaporation is accomplished in a vacuum for removing dislodged particles before they can again adhere to the surface.

15. The method as set forth in claim 13 wherein the step of removing dislodged particles comprises impinging a gas jet onto the surface for imparting a velocity to the dislodged particles adapted to remove the dislodged particles before they can again adhere to the surface.

16. The method as set forth in claim 9 wherein the step of interposing comprises dosing the surface with liquid while maintaining said surface at a temperature sufficiently low to adsorb liquid into interstices between the particle and the surface, and raising the temperature of the surface to a level sufficiently high to desorb surface liquid while retaining liquid in the interstices.

17. A method of removing particles adhered to a surface comprising the steps of:
   dosing the surface with liquid while maintaining the temperature of the surface at a level adequate to cause adsorption of liquid in interstices between the particles and the surface,
   raising the temperature of the surface to a level adequate to desorb any surface liquid while maintaining liquid in the interstices,
   irradiating the surface with laser energy of a wavelength highly absorbed by the liquid in the interstices, and
   absorbing sufficient energy in the liquid to cause explosive evaporation thereof with sufficient force to dislodge the particles.

18. A system for removing particles adhered to a surface, the system comprising in combination:
   means for mounting the surface for particle removal,
   means for applying an energy transfer medium to said surface in such a way as to create a layer of said medium between the particles and said surface to which the particles are adhered,
   laser means for irradiating the surface and causing absorption of laser energy in the medium, and
   means for directing adequate laser energy to the medium to cause explosive evaporation of the medium in the layer thereby to dislodge the particles.

19. The system as set forth in claim 18 in which the means for directing further includes means for limiting the amount of laser energy absorbed by the surface to a level below that capable of damaging said surface.

20. The system as set forth in claim 18 wherein the energy transfer medium is a liquid.

21. The system as set forth in claim 20 further including means for reducing the temperature of the surface during application of the liquid energy transfer medium to assure that liquid is adsorbed on the surface and between the particles and the surface, and means for raising the temperature of the surface after liquid application to desorb surface liquid while maintaining liquid between the particles and the surface.

22. The system as set forth in claim 18 wherein the liquid is water and the laser means comprises an Er:YAG laser having a wavelength of about 2.94 microns which is strongly absorbed by water.

23. The system as set forth in claim 18 further including means for removing dislodged particles before said particles can again adhere to the surface.

* * * * *